Figure 1:
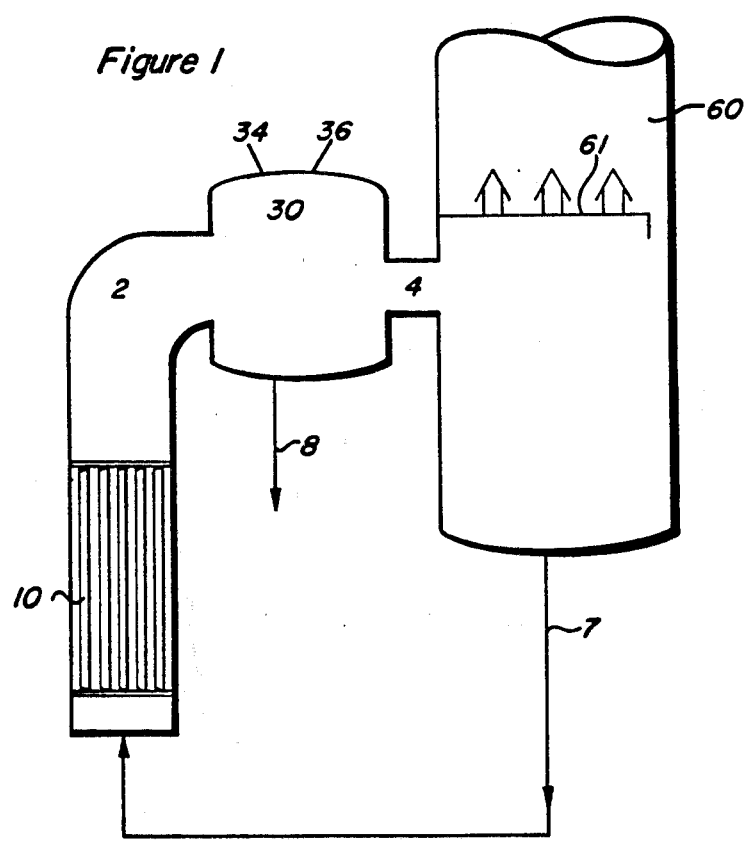

United States Patent [19]

Kurtz

[11] Patent Number: 4,661,207
[45] Date of Patent: Apr. 28, 1987

[54] METHOD FOR CONTROLLING A REBOILER

[75] Inventor: Andrew D. Kurtz, Somerville, N.J.

[73] Assignee: FMC Corporation, Philadelphia, Pa.

[21] Appl. No.: 802,137

[22] Filed: Nov. 27, 1985

[51] Int. Cl.$^4$ ............................................. B01D 3/42
[52] U.S. Cl. ........................................ 203/3; 203/94;
203/98; 203/DIG. 18; 202/205
[58] Field of Search ................... 203/DIG. 25, 98, 1,
203/2, 91, 25, 39, DIG. 8, 94, DIG. 18, 3;
202/160, 205

[56] References Cited

U.S. PATENT DOCUMENTS

| | | | |
|---|---|---|---|
| 2,684,889 | 7/1954 | Crewson et al. | 23/207 |
| 2,895,909 | 7/1959 | Strickland | 208/364 |
| 2,897,146 | 7/1959 | Waddil | 208/364 |
| 2,900,312 | 8/1959 | Gilmore | 202/160 |
| 2,990,341 | 6/1961 | Graybill | 203/12 |
| 3,205,934 | 9/1965 | Vincent et al. | 159/47 |
| 3,242,970 | 3/1966 | Schmole | 159/17 |
| 3,403,080 | 9/1968 | Clay | 203/39 |
| 3,441,483 | 4/1969 | Hart | 203/2 |
| 3,462,348 | 8/1969 | Wellman et al. | 203/28 |
| 3,826,719 | 7/1974 | Boyd et al. | 203/3 |
| 3,838,014 | 9/1974 | Bajek et al. | 203/3 |
| 4,174,273 | 11/1979 | Cros et al. | 208/364 |
| 4,233,267 | 11/1980 | Coker et al. | 422/187 |
| 4,303,468 | 12/1981 | Laguilharre et al. | 203/26 |
| 4,490,215 | 12/1984 | Bannon | 203/98 |

OTHER PUBLICATIONS

Hawley, G. G., "The Condensed Chemical Dictionary", Tenth Edition, Van Nostrand Reinhold Co., N.Y. (1981), p. 465.
Perry et al., "Chemical Engineers Handbook", McGraw-Hill, N.Y. (1973), pp. 10-18 to 10-21; 10-31 to 10-32 and 11-3.
Fair, J. R., "What You Need to Design Thermosiphon Reboilers", *Hydrocarbon Processing & Petroleum Refiner,* 39:2, Feb. 1960, pp. 105-123.
Jacobs, J. K., "Reboiler Selection Simplified", *Hydrocarbon Processing & Petroleum Refiner,* 40:7, Jul. 1961, pp. 189-196.
Palen et al., "Mist Flow in Thermosiphon Reboilers", *CEP,* Jul. 1982, pp. 59-61.
Shah, G. C., "Troubleshooting Reboiler Problems", *CEP,* Jul. 1979, pp. 53-58.

*Primary Examiner*—S. Leon Bashore
*Assistant Examiner*—V. Manoharan
*Attorney, Agent, or Firm*—R. E. Elden; R. L. Andersen; E. C. Seems

[57] ABSTRACT

A problem has been identified which made it difficult, if not impossible, for the prior art to operate a reboiler in the mist flow regime. The invention which overcomes this problem is to provide a chamber to establish equilibrium between the vapor portion and the liquid portion of the reboiler effluent prior to introducing equilibrated vapor into the bottom of the distillation column. The invention is particularly useful for minimizing degradation of thermally sensitive materials.

6 Claims, 1 Drawing Figure

METHOD FOR CONTROLLING A REBOILER

The invention is a method for controlling a reboiler which is vaporizing a sufficiently high percentage of the reboiler feed to be operating in the mist flow regime. More particularly, the invention is a method for controlling the equilibrium composition of the vapor and the liquid within a predetermined range when the reboiler is operating in the mist flow regime. Most particularly, the invention is a method for minimizing thermal fouling of a reboiler surface and thermal degradation of a thermally sensitive material, such as hydrogen peroxide feed to a reboiler when more than 25±5% of the feed is vaporized.

Until the present invention, it was necessary to employ a kettle reboiler if more than 25% of the reboiler feed was to be vaporized. However, a kettle reboiler maintains a relatively large hold up or inventory of liquid at an elevated temperature for a considerable length of time. This is undesirable for reboiler feeds which cause thermal fouling and for temperature sensitive liquids. On the other hand, reboilers with a relatively small liquid hold up suitable for use with temperature sensitive liquids are generally not recommended for a service in which 25% or more of the reboiler feed is to be vaporized, particularly when operating at a subatmospheric pressure.

The prior art has recognized this dilemma for a long time, but has provided no solution. For example, Perry et al., "Chemical Engineers Handbook," Fifth Edition, McGraw-Hill, N.Y. (1973) discloses at 10-18 to 10-21, and 10-31 to 10-32, that the standards for a kettle reboiler have been known since 1950, and for other reboilers since 1960 (Fair, J. R., "What You Need to Know to Design Thermosiphon Reboilers," *Hydrocarbon Processing & Petroleum Refiner*, 39: 2, February 1960, pp 105 to 123). Fair discloses that four flow regimes are known to exist in a vertical reboiler and, of these four, the mist regime is to be avoided even though the greatest percentage vaporization of the reboiler feed occurs in the mist flow regime. The method of the Fair reference is useful only for predicting the onset of the mist flow regime and requires a computer for rigorous treatment. A simplified method of Fair is estimated to be accurate within 30%. Consequently, "25%" includes from about 20% to about 30% for the purpose of this invention and will be written herein as 25±5%.

Useful generalizations for predicting the onset of the mist flow regime can be obtained from Jacobs, J. K., "Reboiler Selection Simplified," *Hydrocarbon Processing & Petroleum Refiner*, 40: 7, July 1961, pp 189 to 196. This reference teaches that while up to 80% of the feed to a kettle reboiler can be vaporized, the vaporization of a thermosiphon reboiler should be limited by weight to 25%±5% and no more than 30% of the feed with 20% the useful "rule of thumb design rate."

Until now the mist flow regime has been regarded as a critical condition to avoid. Palen et al., "Mist Flow in Thermosiphon Reboilers," CEP, July 1982, pp 59 to 61, teaches that a critical design limitation for reboilers such as thermosiphon reboilers is the mist flow regime, which is also referred to as "dryout" in the prior art. In this flow regime poor performance has been observed in process boiling equipment and low heat transfer rates are observed therein because the heat transfer is from the heat exchange surface to the gas phase. The reference discloses that no generalized fluid-independent correlations are available for predicting the onset of the mist flow regime.

The present invention avoids the problems of the prior art by (a) directing bottoms product from a distillation column into a reboiler operating in the mist flow regime to form a vapor portion and a liquid portion, (b) directing the vapor portion and the liquid portion into a chamber, said chamber comprising inlet means, means for directing the vapor portion out of the chamber and into the distillation column, and means for withdrawing the liquid portion from the chamber, (c) contacting the vapor portion and the liquid portion within the chamber to establish equilibrium between the two portions, (d) determining the equilibrium composition of the vapor portion and/or the liquid portion, (e) adjusting equilibrium composition to be within a predetermined range, (f) directing the vapor portion from the chamber into the distillation column, and (g) withdrawing the liquid portion from the chamber.

For the purpose of this invention the expression "bottoms product" is used to indicate the liquid flowing from the bottom plate or support in a distillation column.

The present invention is suitable for use with any reboiler which can operate in the mist flow regime. It is desirable to practice the invention when evaporating more than 20% of the feed to a vertical reboiler. It is critical to practice the invention when operating a reboiler in the mist flow regime. The mist flow regime is when the liquid is the discontinuous phase and the vapor portion is the continuous phase and is usually distinguished by the wall temperature of the heat exchanger approaching the temperature of the heating fluid.

In the normal configuration the top outlet of a reboiler operating in the annular or slug flow regime is connected to the bottom of the distillation column or still bottom by an elbow conduit means which contains sensing means such as temperature and pressure instruments to measure the equilibrium concentration of the vapor portion and the liquid portion of the reboiler effluent. The still bottom normally is used to separate the vapor portion from the liquid portion. Table I demonstrates the problem which was not recognized in the prior art and was found to exist in the normal configuration operating in the mist flow regime. The vapor portion in the elbow was found to be superheated and not in equilibrium with the liquid portion as is the case when a reboiler is operating in other flow regimes. Therefore, it was impossible to control the reboiler. Equilibrium between the liquid portion and the vapor portion existed within the still bottom. The present invention overcomes this problem of controlling the reboiler.

Further, the present invention provides a means to reduce the decomposition or thermal fouling inherent in the prior art processes when vaporizing 25±5% or more of the bottoms product in a reboiler. For example, a kettle reboiler was heretofor employed when vaporizing 25±5% or more of the reboiler feed. However, a kettle reboiler is recognized to be unsatisfactory for vaporizing a temperature sensitive bottoms product which can cause fouling of the heat exchanger surfaces. Further, as a kettle reboiler requires a large liquid hold up of the concentrated product, its use would result in the excessive decomposition of a thermally unstable compound such as hydrogen peroxide.

The prior art alternative to a kettle reboiler is equally unsatisfactory for vaporizing 25±5% or more of the bottoms product. The alternative is a thermosiphon or forced circulation reboiler with recycle, the evaporation per pass being less than 25±5% of the reboiler feed. Such recycling is clearly undesirable for a temperature sensitive compound because it also requires maintaining a large volume of the concentrated liquid at a high temperature for an extended time. This also creates a safety problem if the temperature sensitive bottoms product contains a compound with a large heat of decomposition such as hydrogen peroxide. Further, in the prior art process the liquid portion of the reboiler effluent is generally blended with bottoms product. As a consequence, the liquid portion of the reboiler effluent must be evaporated to a higher concentration than the liquid portion of the reboiler effluent of the present invention when operating to produce the same process stream concentrations. An additional advantage of the present invention over both prior art alternatives is seen when producing hydrogen peroxide. There it is essential to control the reboiler to avoid operating within a detonable composition range when producing high product concentrations.

The warnings of Palen, supra, that operating in the mist flow regime would cause poor performance of process boiling equipment may be explained either by the decreased heat transfer rate or by the lack of equilibrium at the elbow above the reboiler (where such measurements are conventionally made) or by both. It is clearly undesirable to attempt to control reboiler operation by measurements within the still bottom because such measurements can be affected by leakage of the bottoms product from the column into the still bottom and because instruments located there often cannot rapidly sense changes in the reboiler. In spite of these difficulties the high percentage of vaporization of feed makes it desirable to operate a reboiler in the mist flow regime.

In the present invention, the equilibrium composition of the vapor portion and the liquid portion of the effluent from the reboiler may be determined by conventional measurements within the chamber, which chamber provides the added contact time necessary for the liquid portion and the vapor portion to attain equilibrium. On the other hand, determinations may be made on samples withdrawn from the chamber to determine the equilibrium compositions. Temperature and pressure determinations at equilibrium are frequently sufficient to determine the compositions of the vapor portion and the liquid portion. However, other properties such as specific gravity, index of refraction, specific rotation, absorption coefficient, trace analyses and other chemical and physical properties may be useful criteria for operation.

Having determined the composition at equilibrium, it is critical to make any adjustments necessary to maintain the liquid portion and the vapor portion within the desired operating range. This may be accomplished by adjusting any of the still operating parameters of the distillation column. Frequently, the heat input to the reboiler may be the primary adjustment made, but the feed rate, the composition of the feed to the distillation column, the reflux rate or other operating parameter may be adjusted to maintain the equilibrium composition within a predetermined range.

It is understood that the vapor portion and the liquid portion of the effluent from the reboiler will separate, at least in part, in a chamber without any means other than gravity. In the normal reboiler configuration the separated liquid portion of the effluent would be swept into the still bottom by the vapor portion. In the present invention, it is critical for at least part of liquid portion of the effluent to be withdrawn from the chamber rather than enter into the still bottom. Optionally, the chamber may contain separator means to modify the separation efficiency therein. For example, the chamber may be designed to impart a centrifugal force to the vapor portion and the liquid portion to assist in removing a liquid portion entrained in the vapor portion. Alternatively, the chamber may contain internal means to modify the vapor-liquid separation such as packing, a mist eliminator or an impinger.

Usually it is desirable to minimize entrainment of liquid portion in the vapor portion directed into the distillation column. This is particularly desirable when the liquid portion is a thermally-sensitive compound subject to polymerization, decomposition or deterioration. However, the present invention is not limited to vaporizing only thermally sensitive compounds but is suitable for any bottoms product which can be vaporized in the mist flow regime. Consequently, it is not necessary to minimize entrainment so that one skilled in the art can readily determine the degree of entrainment desirable in any particular application.

Thermally sensitive materials may include compounds which irreversibly disproportionate on heating such as hypochlorite salts, borohydride salts, hydrogen peroxide and other peroxygens, complex sulfides such as hydrosulfites and sulfur monohalides. Other thermally sensitive compounds include aqueous condensed phosphate salts, sugar solutions, optically active compounds, biologically active compounds, flavorings and urea derivatives. In addition, the prior art repeatedly discloses that many feeds to reboilers contain compounds which polymerize thermally to form gels or gums which build up on the heat exchanger surface.

The present invention has other advantages over the prior art. One such advantage of the invention is that a vertical thermosiphon reboiler can be used to vaporize more than 25±5% of the reboiler feed and so eliminate the need of a kettle reboiler. The vertical thermosiphon reboiler has the advantage of being inexpensive, easily supported, compact and easily cleaned compared with a kettle reboiler. In addition, the present invention eliminates the need for expensive internals, such as weirs and partitions, within the bottom of the distillation column which internals are usually required, or employed, when using a thermosiphon reboiler.

Another advantage of operating in the mist flow regime is that the superheated vapor portion continues to heat the liquid portion of the reboiler effluent in the absence of a solid surface. This is particularly desirable when the liquid portion contains a thermally sensitive material or when a solid phase is likely to form in the liquid portion. The latter is particularly likely to occur when the liquid portion contains a compound with an inverse thermal solubility such as calcium sulfate decahydrate.

FIG. 1 shows one preferred embodiment of the present invention employing a thermosiphon reboiler.

In FIG. 1 the bottom section of distillation column 60 is connected below plate or collector tray 61 by conduit 7 to the bottom of reboiler 10. The top of reboiler 10 is connected by conduit means 2 to chamber 30 which contains temperature sensor 34 and pressure sensor 36.

Chamber 30 is connected by vapor conduit 4 for directing a vapor portion from chamber 30 to the bottom section of distillation column 60, preferably below the plate or collector tray 61, and by liquid conduit 8 for withdrawing a liquid portion from chamber 30 into collector means, such as product collection line or tank (not shown).

In operation the bottoms product from the bottom plate or collector tray 61 flows into the bottom of distillation column 60 and is directed through conduit 7 into reboiler 10. There the bottoms product is partially vaporized and both the vapor portion and the liquid portion ejected from reboiler 10 are directed by conduit 2 into chamber 30. Chamber 30 provides sufficient contact time for the liquid portion and vapor portion to attain equilibrium. The equilibrium conditions are sensed by temperature sensor 34 and pressure sensor 36 thereby determining the composition of the vapor portion and liquid portion. A vapor portion is directed from chamber 30 by conduit 4 into the bottom of distillation column 60, and a liquid portion is withdrawn concomitantly from chamber 30 through conduit 8 to collector means (not shown).

TABLE I
CALCULATED AND ACTUAL HYDROGEN PEROXIDE CONCENTRATIONS

| % Vaporization | % W/W $H_2O_2$ | Reboiler | | | Column Bottom | | |
|---|---|---|---|---|---|---|---|
| | | Temp. °C. | Press. kPa | % $H_2O_2$ Calc. | Temp. °C. | Press. kPa | % $H_2O_2$ Calc. |
| 58 | 63.1 | 72 | 12.7 | 70.5 | 67 | 12.0 | 64 |
| 62 | 70.9 | 74 | 12.7 | 73.3 | 71 | 11.5 | 72 |
| 58 | 65.8 | 73.1 | 12.7 | 72.2 | 66.7 | 11.3 | 66 |
| 54 | 67.4 | 73.6 | 12.7 | 73.0 | 69 | 11.7 | 69 |
| 50 | 65.2 | 73 | 12.7 | 72.0 | 64.5 | 10.4 | 65 |
| 44 | 65.5 | 73.5 | 12.5 | 73.1 | 66.5 | 10.5 | 68 |
| 51 | 67.1 | 74 | 12.8 | 73.0 | 62.8 | 9.3 | 66 |

I claim:

1. A method for controlling the partial vaporization of the bottoms product from a distillation column employing a reboiler operating in the mist flow regime to provide a vapor portion and a liquid portion within a predetermined equilibrium composition range, comprising,
    (a) directing bottoms product from the distillation column into the reboiler to form a vapor portion and a liquid portion,
    (b) directing the vapor portion and the liquid portion into a chamber, said chamber comprising inlet means, means for directing the vapor portion out of the chamber and into the distillation column, and means for withdrawing the liquid portion from the chamber,
    (c) contacting the vapor portion and the liquid portion within the chamber to establish equilibrium between the two portions,
    (d) determining the equilibrium composition of the vapor portion and the liquid portion,
    (e) adjusting the equilibrium composition to be within a predetermined range,
    (f) directing the vapor portion from the chamber into the distillation column, and
    (g) withdrawing the liquid portion from the chamber.

2. The method of claim 1 wherein the pressure of the vapor portion in step (a) is less than atmospheric pressure.

3. A method for vaporizing at least 25±5% of a thermally sensitive bottoms product from a distillation column, comprising,
    (a) directing the bottoms product from the distillation column into a reboiler to form a vapor portion and a liquid portion, the vapor portion comprising at least 25±5% by weight of the bottoms product,
    (b) directing the vapor portion and the liquid portion into a chamber, said chamber comprising inlet means, means for directing the vapor portion out of the chamber and into the distillation column, and means for withdrawing the liquid portion from the chamber,
    (c) contacting the vapor portion and the liquid portion within the chamber to establish equilibrium between the two portions,
    (d) determining the equilibrium composition of the vapor portion and the liquid portion,
    (e) adjusting the equilibrium composition to be within a predetermined range,
    (f) directing the vapor portion from the chamber into the distillation column, and
    (g) withdrawing the liquid portion from the chamber.

4. The process of claim 3 wherein the thermally sensitive bottoms product comprises an aqueous solution of hydrogen peroxide.

5. The method of claim 3 wherein the pressure of the vapor portion in step (a) is less than atmospheric pressure.

6. The method of claim 4 wherein the pressure of the vapor portion in step (a) is less than atmospheric pressure.

* * * * *